United States Patent [19]

Enomoto

[11] Patent Number: 5,999,510
[45] Date of Patent: Dec. 7, 1999

[54] APPARATUS AND METHOD FOR RECORDING/REPRODUCING INFORMATION

[75] Inventor: Kunishige Enomoto, Tokyo, Japan

[73] Assignee: NEC Corporation, Tokyo, Japan

[21] Appl. No.: 09/139,713

[22] Filed: Aug. 25, 1998

[30] Foreign Application Priority Data

Aug. 25, 1997 [JP] Japan ................................. 9-227681

[51] Int. Cl.⁶ ............................................... G11B 20/10
[52] U.S. Cl. ........................... 369/124; 369/13; 369/48; 369/59
[58] Field of Search ................................ 369/13, 48, 47, 369/58, 59, 124

[56] References Cited

U.S. PATENT DOCUMENTS

| | | | |
|---|---|---|---|
| 4,743,774 | 5/1988 | Maeda et al. | 369/124 X |
| 5,311,493 | 5/1994 | Fuji | 369/59 |
| 5,574,709 | 11/1996 | Takeda | 369/59 |
| 5,598,389 | 1/1997 | Nakano et al. | 369/48 |
| 5,790,482 | 8/1998 | Saga et al. | 369/13 |

FOREIGN PATENT DOCUMENTS

| | | |
|---|---|---|
| 3-228263 | 10/1991 | Japan . |
| 4-232659 | 8/1992 | Japan . |
| 4-325925 | 11/1992 | Japan . |

*Primary Examiner*—John W. Cabeca
*Assistant Examiner*—Kim-Kwok Chu
*Attorney, Agent, or Firm*—Foley & Lardner

[57] ABSTRACT

A recording/reproducing apparatus and method can accurately reproduce high density record information by the mark-edge recording method. The apparatus and method can use a sag cancellation circuit or a reference slice level follow-up circuit immediately before or at amplitude limitation for amplitude of a read signal to attain transient correction. As a result, the recorded information can be reproduced even under a reproduction environment with a low signal to noise ratio without an amplitude limiter circuit for narrowing the margin for transient caused by sudden variation of direct current.

10 Claims, 7 Drawing Sheets

APPARATUS AND METHOD FOR RECORDING/REPRODUCING INFORMATION

BACKGROUND OF THE INVENTION

The present invention relates to a method and apparatus for reproducing information in which information is recorded and reproduced at a high speed and high density using information reproduction means which uses magnetic force or a laser beam, and, more particularly, to a method and apparatus for optically reproducing information with a laser beam or the like.

In an information recording/reproduction system using an optical or magnetic disk as a recording medium, there are a mark-position recording/reproduction scheme and a mark-edge recording/reproduction scheme.

In recent years, attention is being focused on a mark-edge recording scheme in which information is provided for the leading and trailing edges of a mark as a technology enabling high density recording.

To reproduce the mark-edge recorded information, there have been known a second order differential zero-cross detection type in which a read signal is second order differentiated for detecting a zero-cross point corresponding to an edge position, and a DC slice detection type in which a read signal is binary coded by slicing it with a reference level.

The edge reproduction scheme of such second order differential zero-cross detection type has an advantage that an apparatus can be easily implemented with a simple circuit configuration since its characteristics are not affected even if there is a sudden direct current (DC) variation due to defects or immediately after erasure of record, but it is very sensitive to a reproduced S/N ratio and distortion of waveform.

That is, the edge reproduction scheme of the second order differential zero-cross detection type has various problems. Noises (medium noise, LD noise, circuit noise or the like) causing problems in reading may be enhanced by the differential, and an inflection point of a second order differential signal does not correspond to an edge position of a record mark due to waveform distortion. These factors deteriorate an information signal detection accuracy, disabling to reduce the reproduction error rate.

Then, as an example of means for solving such disadvantage, Japanese Patent Publication (Unexamined) No. A-4-232659 proposes to use amplitude limitation means for the edge reproduction scheme of the second order differential zero-cross detection type.

FIG. 5 is an example of arrangements for conventional information recording/reproduction apparatus, while FIG. 6 illustrates the operation of information recording/reproduction apparatus of FIG. 5.

Information recorded on an information recording medium is extracted by an optical head 1, and amplified by an amplifier circuit 2.

The amplified read signal (a) is corrected for resolution by a linear phase type waveform equalizer circuit 3 to obtain a signal (c) limited for amplitude with an amplitude limiting circuit 5. The amplitude limited signal (c) is differentiated by a differential circuit 7 to obtain a first order differential signal (d), and compared for level with positive and negative slice levels $+V_T$ and $-V_T$ by a change direction extraction circuit 9 to obtain binary signals (f) and (g) for a direction of signal change. In addition, the first order differential signal (d) is differentiated by a differential circuit 8 to obtain a second order differential signal (e), and an inflection point signal (h) of the read signal is extracted by a zero-cross comparator circuit 10. An edge of the read data signal is extracted and binary coded from a timing relationship between the binary coded signals (f), (g) and the inflection point signal (h).

In such prior art, it has been believed that the reproduction error rate of read data information can be reduced by improving the reproduction S/N ratio or eliminating waveform distortion with the amplitude limiting means even in the edge reproduction scheme in the second order differential zero-cross detection type.

However, when the amplitude limiting means is applied to the edge reproduction scheme in the second order differential zero-cross detection type, it is only to improve the reproduction S/N ratio, which is a disadvantage shortcomings of this scheme, narrowing the characteristic margin against sudden direct current variation, which margin is originally an advantage of this scheme.

Then, there is a problem that reproduction error tends to occur (although the reproduction S/N ratio is improved) because up to an original edge extraction point is eliminated and lost by the amplitude limiting means was the variation of direct current component becomes significant as in the case immediately after erasure of a record or a defect in the recording medium.

SUMMARY OF THE INVENTION

An object of the present invention is to provide an information recording/reproduction apparatus which is improved for the conventional technical problems described above, and which can accurately reproduce high density record information by the mark-edge recording method or the like even under a reproduction environment with low S/N ratio or in a state where direct current suddenly changes.

To attain the above object, the present invention adopts the following basic technical arrangement.

That is, a first aspect of the present invention is an information recording/reproduction apparatus for reproducing data recorded on an information recording medium, the apparatus comprising an information detector circuit for extracting the recorded information, a waveform equalizer circuit for correcting lowering of resolution of the information detector circuit, a sag cancellation circuit for correction transient of an output waveform from the waveform equalizer circuit, an amplitude limiter circuit for limiting amplitude of an output signal from the sag cancellation circuit, a filter circuit for eliminating high frequency noise components in an output signal from the amplitude limiter circuit, a first waveform differential circuit for differentiating an output signal from the filter circuit to obtain a first order differential signal, a second waveform differential circuit for differentiating the first order differential signal to obtain a second order differential signal, an enable signal generator circuit for level comparing the first order differential signals to obtain a change direction signal for differential signals, a zero-cross signal generator circuit for obtaining an edge information signal from the second order differential signal, and an edge pulse generator circuit for obtaining a read data signal from the change direction signal and the edge information signal A second aspect of the present invention is an information recording/reproduction apparatus for reproducing data recorded on an information recording medium, the apparatus comprising an information detector circuit for extracting the recorded information, a waveform equalizer circuit for correcting lowering of resolution of the information detector circuit, a variable slice level setting circuit for following transient of an output waveform from the waveform equalizer circuit, an amplitude limiter circuit being input with an output of the variable slice level setting circuit and an output of the waveform equalizer circuit, a filter circuit for eliminating high frequency noise components in an output signal from the amplitude limiter circuit, a first waveform differential circuit for differentiating an output signal from the filter circuit to obtain a first order differential signal, a second waveform differential circuit for differentiating the first order differential signal to obtain a second order differential signal, an enable signal generator circuit for level comparing the first order differential signals to obtain a change direction signal for differential signals, a zero-cross signal generator circuit for obtaining an edge information signal from the second order differential signal, and an edge pulse generator circuit for obtaining a read data signal from the change direction signal and the edge information signal.

DETAILED DESCRIPTION OF THE PREFERRED EMBODIMENTS

Since the information recording/reproduction apparatus of the present invention adopts a basic technical arrangement as described above, a sag cancellation circuit or a reference slice level follow-up circuit may be provided immediately before or at amplitude limitation for amplitude of a read signal to attain transient correction, so that information can be accurately reproduced even under low S/N environment without the amplitude limiter circuit for narrowing the margin for transient involved in sudden variation of direct current, which margin is the original advantage of the edge reproduction scheme of the second order differential zero-cross detection type.

Now, an embodiment of information recording/reproduction apparatus will be described with reference to the drawings.

Figure 1:
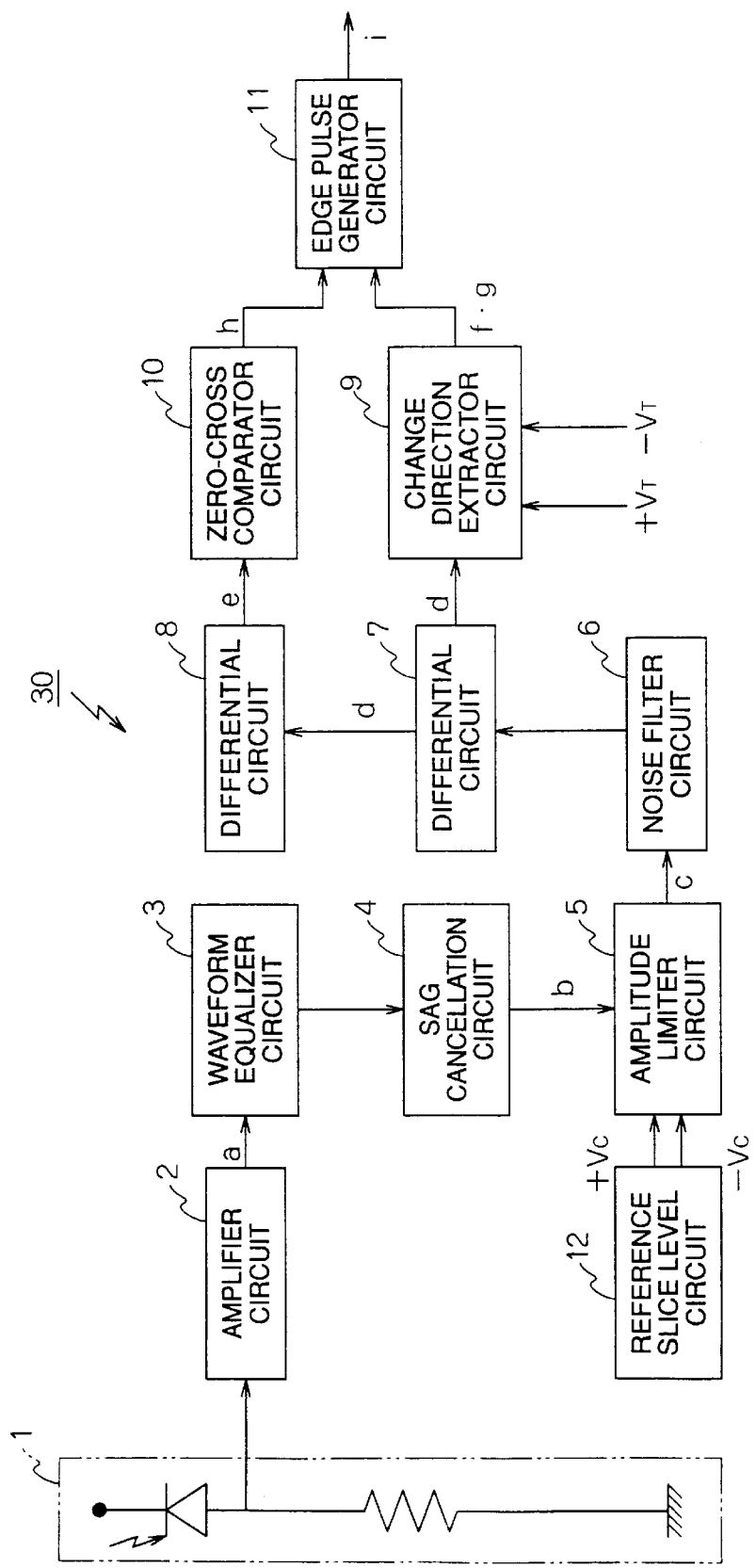
FIG. 1 is a block diagram for illustrating an arrangement of an embodiment of an information recording/reproduction apparatus according to the present invention.

FIG. 1 is a block diagram for illustrating an arrangement of one embodiment of information recording/reproduction apparatus 30 according to the present invention. In the figure, the information recording/reproduction apparatus 30 for reproducing information recorded on an information recording medium is shown to comprise an information detector circuit 1 for extracting the recorded information, a waveform equalizer circuit 3 for correcting lowering of resolution in the information detector circuit 1 through a suitable amplifier circuit 2, a sag cancellation circuit 4 for correcting transient of an output waveform of the waveform equalizer circuit 3, an amplitude limiter circuit 5 for limiting the amplitude of the output signal from the sag cancellation circuit 4, a filter circuit 6 for eliminating high frequency noise components of the output signal from the amplitude limiter circuit 5, a first waveform differentiate circuit 7 for differentiating the output signal from the filter circuit 6 to obtain a first order differential signal, a second differentiate circuit 8 for differentiating the first order differential signal to obtain a second order differential signal, a change direction extractor circuit 9 for level comparing the first order differential signal to obtain a change direction signal for differential signals, a zero-cross signal generator circuit 10 for obtaining an edge information signal from the second order differential signal, and an edge pulse generator circuit 11 for obtaining a read data signal from the change direction signal and the edge information signal.

In addition, in the present invention, the amplitude limiter circuit 5 preferably further comprises a reference slice level circuit 12.

Figure 2:
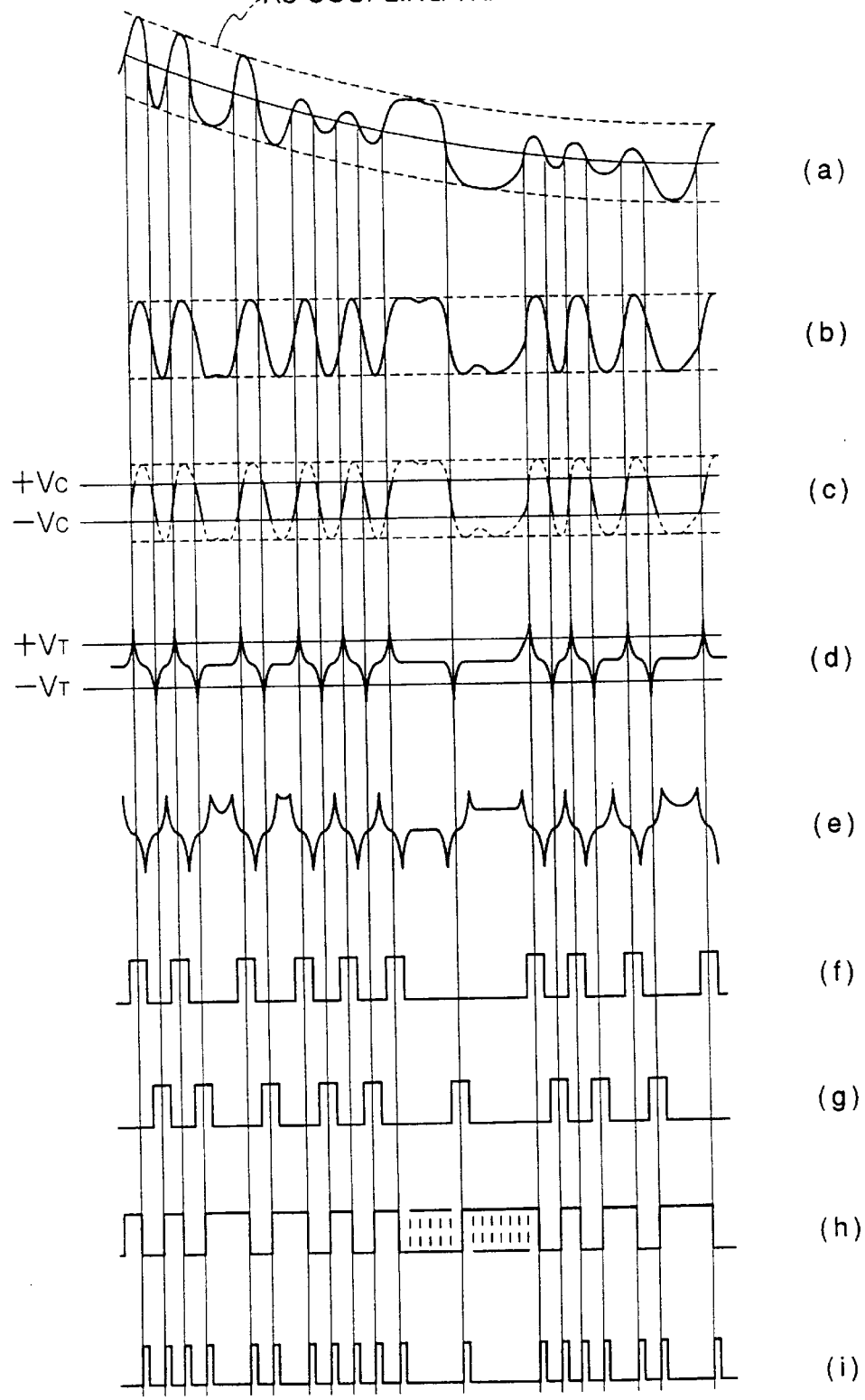
FIG. 2 is waveforms for illustrating an operation of an embodiment according to the present invention.

Now, more detailed description is given the arrangement and operation of the information recording/reproduction apparatus 30 according to the present invention with reference to FIGS. 1 and 2.

The information recording/reproduction apparatus 30 of the embodiment comprises an optical head 1, for example, for extracting information recorded on a recording medium, an amplifier circuit 2 for amplifying a read signal, a linear phase type waveform equalizer circuit 3 for correcting inter-code interference causing lowering of resolution of the optical system, a sag cancellation circuit 4 for correcting transient due to AC coupling of circuitry, an amplitude limiter circuit 5 for limiting amplitude of an output signal which is compensated for frequency characteristic by the waveform equalizer circuit 3 and the sag cancellation circuit 4, a noise filter circuit 6 for eliminating high frequency noise in the signal, a first differentiate circuit 7 for differentiating the output signal passed through the noise filter circuit 6 to obtain a first order differential signal, a second differentiate circuit 8 for differentiating the first order differential signal to obtain a second order differential signal, a change direction extractor circuit 9 for level comparing the first order differential signal to obtain a change direction signal, a zero-cross comparator circuit 10 for obtaining an inflection point signal which is edge information from the second order differential signal, and an edge pulse generator circuit 11 including a timing control circuit for the change direction signal and the inflection point signal, and for obtaining a read data signal.

With such embodiment, information signal on the recording medium is detected by the optical head 1, and amplified by, for example, an AC coupled amplifier circuit 2.

The read signal (a) is lowered in resolution due to inter-code interference, and the resolution is improved by using a linear phase type waveform equalizer circuit 3 such as a transversal filter.

In addition, waveform transient which occurs when the information signal passes through the AC coupled circuit such as the amplifier circuit 2 is corrected by, for example, the sag cancellation circuit 4 of the linear phase type having a capability for enhancing low frequency gain.

The read signal (b) which is compensated for frequency by the waveform equalizer circuit 3 and the sag cancellation circuit 4 is input into, for example, the amplitude limiter circuit 5 with low distortion and wide dynamic range, and limited for amplitude by clipping positive and negative ends.

The amplitude limiter circuit 5 is provided with a reference slice level circuit 12 for clipping amplitude, thereby limiting an input signal waveform with positive and negative fixed voltage $+V_C$ and $-V_C$.

The positive and negative fixed voltage $+V_C$ and $-V_C$ may be arbitrarily established depending on amount of limit for amplification.

The amplitude limited signal (c) is passed through the noise filter circuit 6 for eliminating high frequency noise components, and differentiated by the differentiate circuit 7 to be a first order differential signal (d).

In this case, since the first order differential signal (d) is obtained by differentiating the amplitude limited signal (c) with steep rising and falling characteristics, it has a narrower half-band width than a case where the read signal (a) is merely differentiated.

In addition, the differentiate circuit 8 differentiates the first order differential signal (d) to provide a second order differential signal (e).

Such first order differential signal (d) is level compared for slice levels $+V_T$ and $-V_T$ by the change direction extractor circuit 9 to provide binary signals (f), (g) for change direction of the signal.

In addition, differential zero-cross of the second order differential signal (e) is determined by the zero-cross comparator circuit 10 to obtain an inflection point signal (h) which becomes edge information. The binary signals (f), (g) and the inflection point signal (h) are timing controlled taking circuit delay of the edge pulse generator circuit 11 into account, and converted into a read data signal (i).

Figure 3:
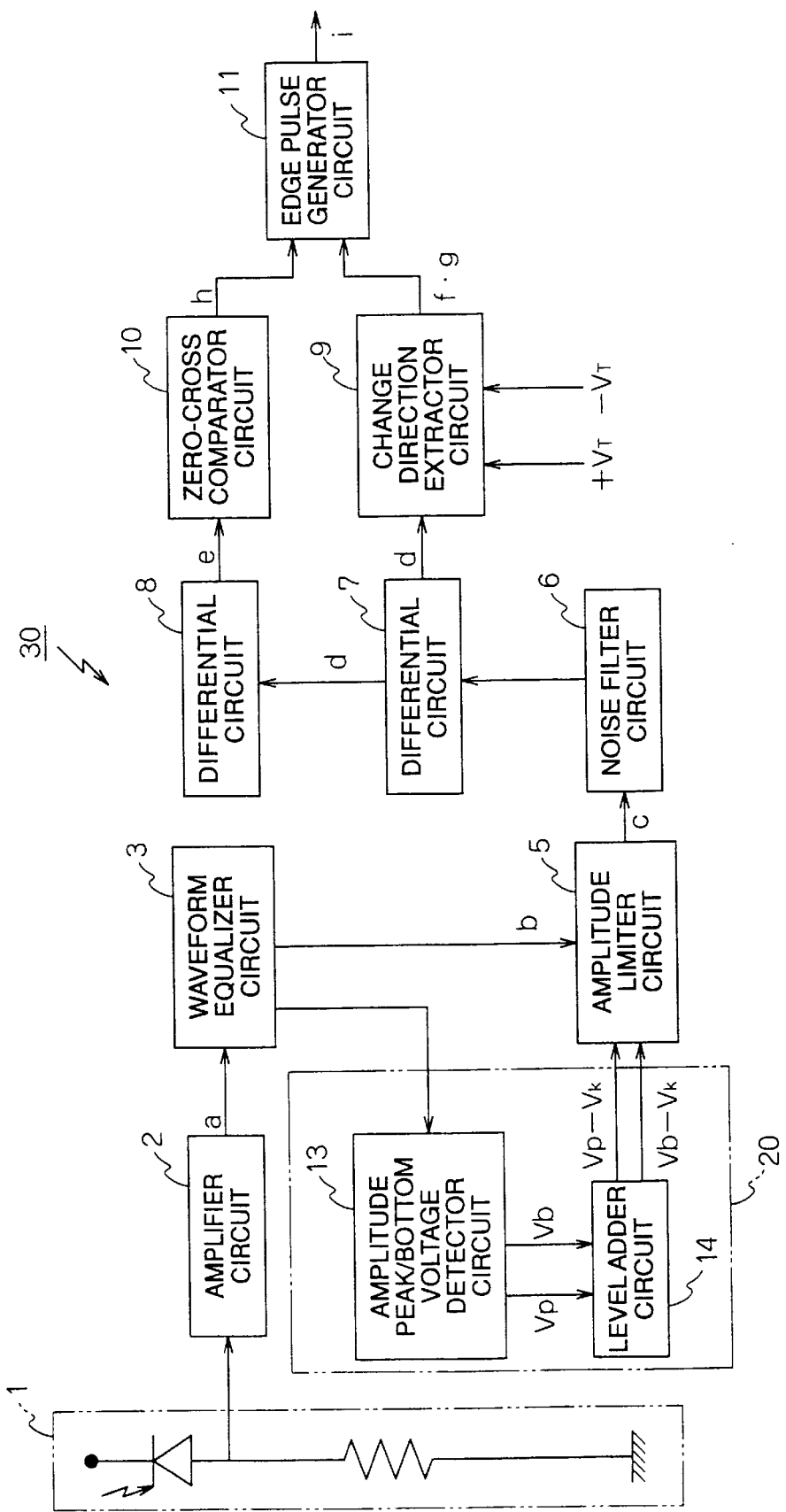
FIG. 3 is a block diagram for illustrating an arrangement of another embodiment of an information recording/reproduction apparatus according to the present invention.
Figure 4:
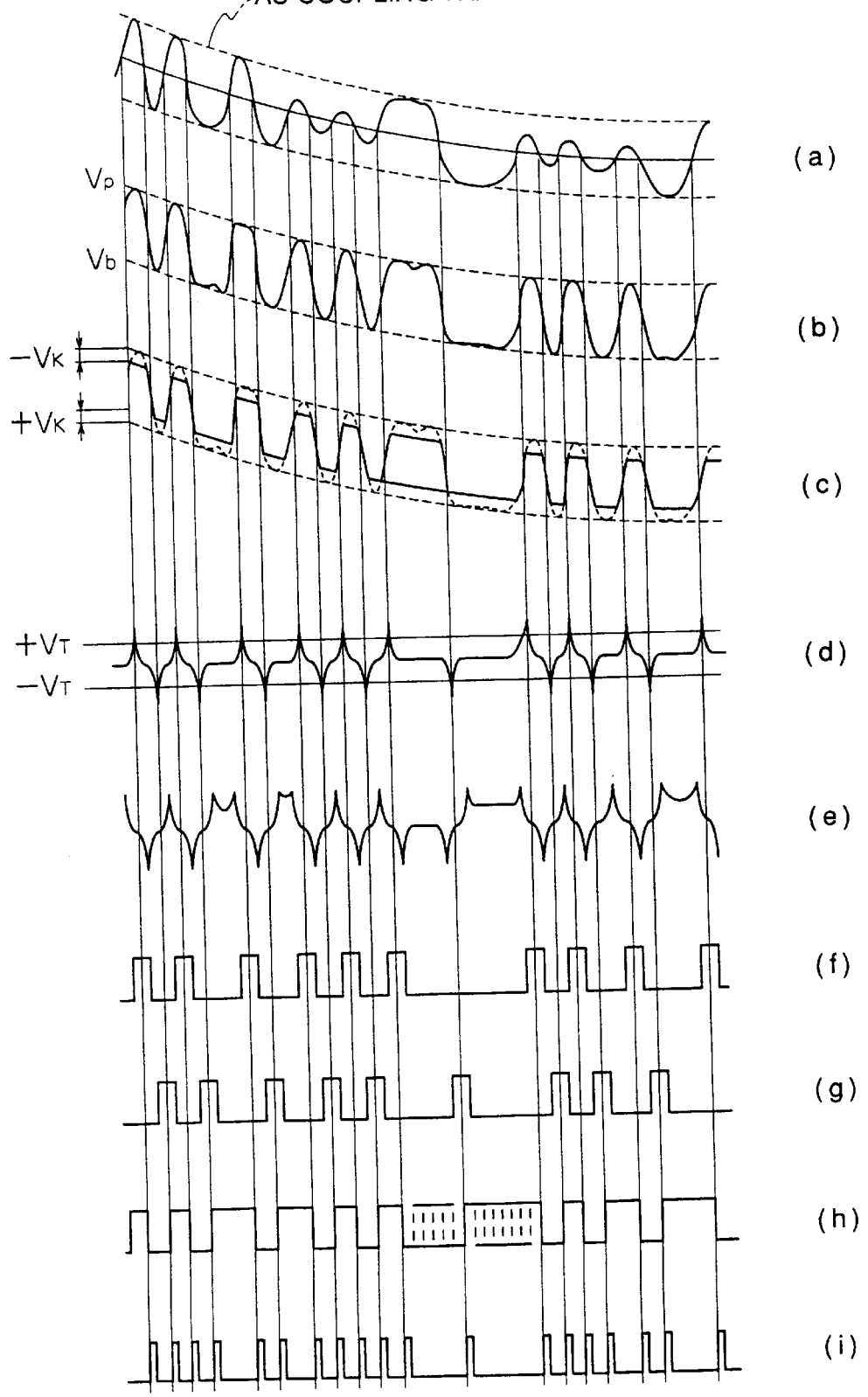
FIG. 4 is waveforms for illustrating an operation of another embodiment according to the present invention.
Figure 5:
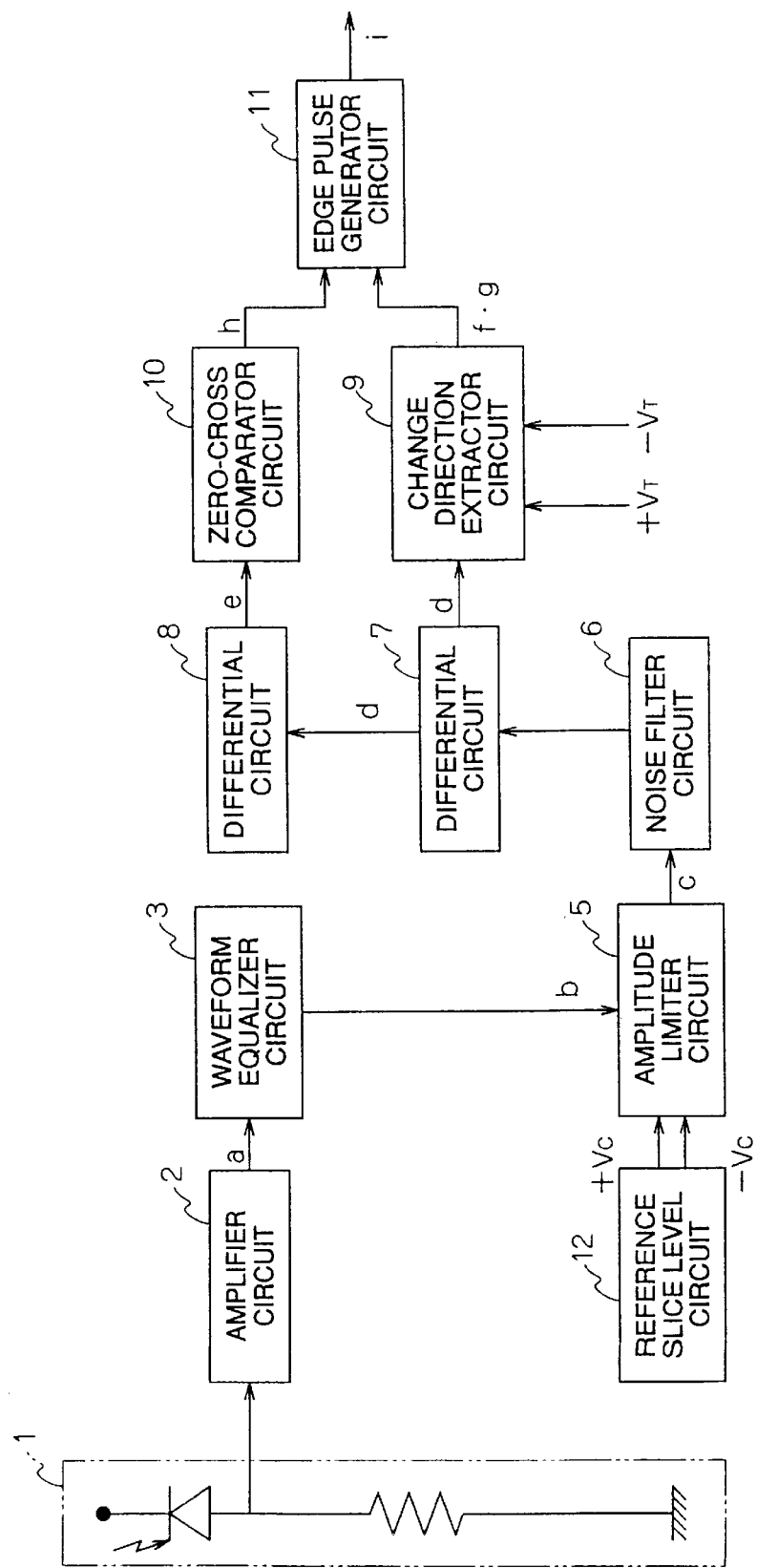
FIG. 5 is a block diagram showing an example of a conventional information recording/reproduction apparatus.
Figure 6:
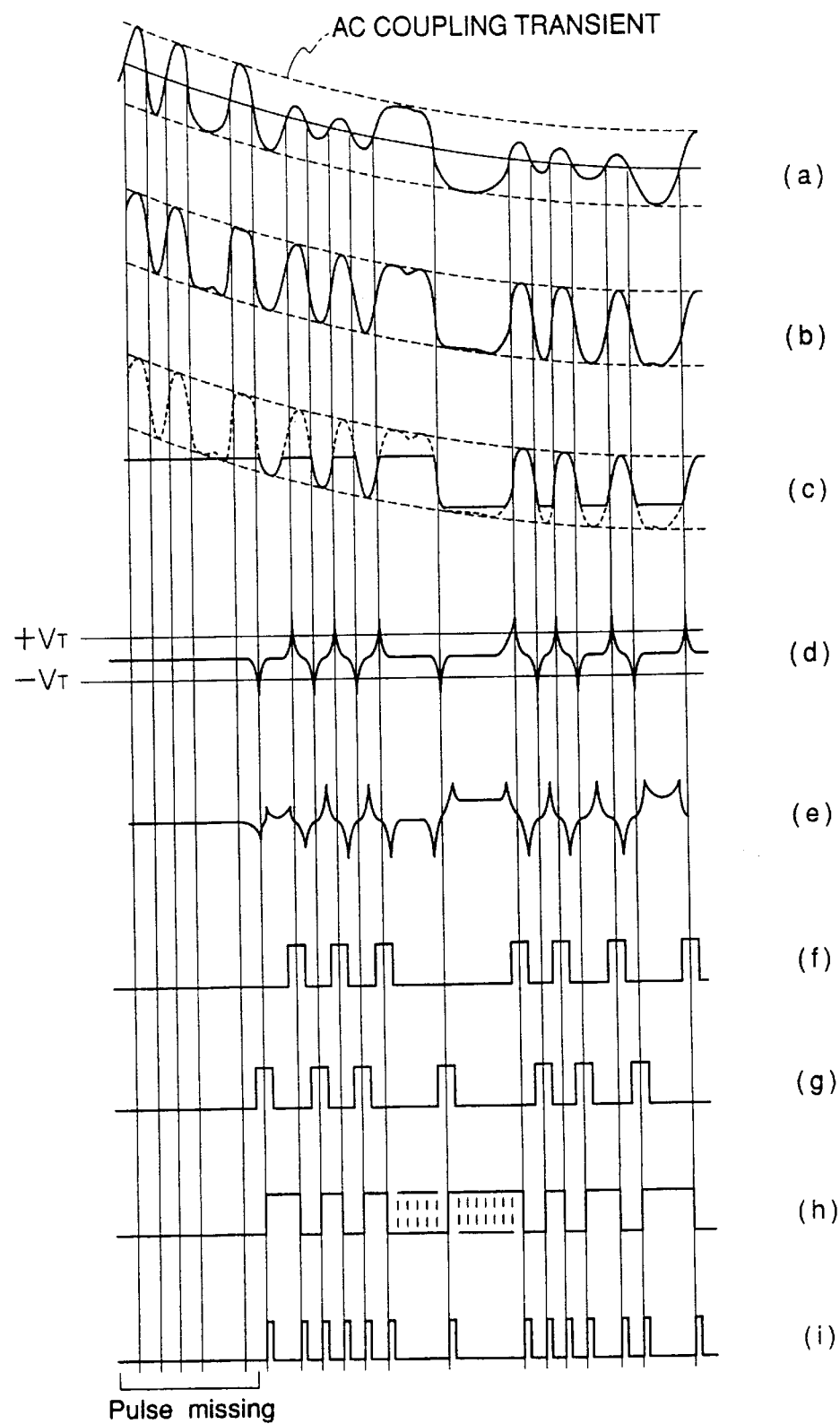
FIG. 6 is waveforms for illustrating an operation of a conventional information recording/reproduction apparatus.

Now, description is given another embodiment of the information recording/reproduction apparatus 30 according to the present invention with reference to FIGS. 3 and 4.

The information recording/reproduction apparatus 30 of this embodiment according to the present invention is principally same as the previous embodiment, as shown in FIG. 3, except for that it comprises a variable slice level setting circuit 20 which will be illustrated later, in place of the sag cancellation circuit 4.

That is, a second embodiment according to the present invention is an information recording/reproduction apparatus 30 comprising an optical head 1, for example, for extracting information recorded on a recording medium, an amplifier circuit 2 for amplifying a read signal, a linear phase type waveform equalizer circuit 3 for correcting inter-code interference causing lowering of resolution of the optical system, a variable slice level setting circuit 20 for following transient of an output waveform from the waveform equalizer circuit 3, an amplitude limiter circuit 5 being input with an output of the variable slice level setting circuit 20 and an output of the amplitude limiter circuit, a filter circuit 6 for eliminating high frequency noise components in an output signal from the amplitude limiter circuit 5, a first waveform differential circuit 7 for differentiating an output signal from the filter circuit 6 to obtain a first order differential signal, a second waveform differential circuit 8 for differentiating the first order differential signal to obtain a second order differential signal, an enable signal generator circuit 9 for level comparing the first order differential signals to obtain a change direction signal for differential signals, a zero-cross signal generator circuit 10 for obtaining an edge information signal from the change direction signal, and an edge pulse generator circuit 11 for obtaining a read data signal from the change direction signal and the edge information signal.

Here, in the information recording/reproduction apparatus 30 according to the present invention, the variable slice level setting circuit 20 preferably comprises an amplitude peak/bottom voltage detector circuit 13 for detecting amplitude peak and bottom voltage from the output of the waveform equalizer circuit 3, and a level adder circuit 14 for determining amount of limit from these voltage.

The information recording/reproduction apparatus 30 of this embodiment has principally same arrangement as the information recording/reproduction apparatus 30 of the previous embodiment, but is different in that, as described above, it utilizes a variable slice level following the transient as the reference slice level, rather than the positive and negative fixed voltage.

That is, while the previous embodiment varies the waveform itself of the read signal input into the amplitude limiter circuit 5 of the information recording/reproduction apparatus 30, the information recording/reproduction apparatus 30 of this embodiment does not vary the read signal, but varies the slice level for determining the mount of limit of amplitude to limit the amplitude.

This embodiment detects amplitude peak and bottom voltage Vp and Vb of the read signal (b), which is compensated for the frequency characteristic by, for example, the waveform equalizer circuit 3, with the amplitude peak/bottom voltage detector circuit 13, adds levels of any voltage $+V_k$ and $-V_k$ for determining amount of limit from these voltage with the level adder circuit 14, and clips the amplitude with the voltage after the level addition.

After this circuit, the read data signal is detected in the same manner as the previous embodiment.

According to this embodiment, since compensation is performed for the transient of read signal (a), the original edge extraction point is not lost by the limiting operation by the amplitude limiter circuit 5 even when there is sudden transient immediately after erasure of a record or defect in the medium, so that there is no possibility of missing pulses at the edge region, which was a problem in the conventional method, thereby allowing accurate and precise edge detection.

As described above, the method for reproducing information using the information recording/reproduction apparatus 30 according to the present invention has, for example, the following arrangement.

An information recording/reproduction method for reproducing data recorded on a information recording medium comprises the steps of information detection for extracting the recorded information; correcting for the detected information inter-code interference of an output signal causing lowering of resolution, which occurs when the information is detected, with a waveform equalizer circuit; correcting transient in an output waveform output from the waveform equalizer circuit with a sag cancellation circuit; limiting amplitude of the output signal from the sag cancellation circuit with a amplitude limiter circuit; eliminating high frequency noise components in an output signal from the amplitude limiter circuit; differentiating the output signal, from which the high frequency noise components are eliminated, to obtain a first order differential signal; differentiating the first order differential signal to obtain a second differential signal; level comparing the first order differential signal to obtain a change direction signal of the differential signal; obtaining an edge information signal from the second order differential signal; and obtaining a read data signal from the change direction signal of the differential signal and the edge information signal.

In addition, another information recording/reproduction method of the present invention is, for example, an information recording/reproduction method for reproducing data recorded on a information recording medium, the method comprising the steps of information detection for extracting the recorded information; correcting inter-code interference of an output signal causing lowering of resolution, which occurs when the information is detected, with a waveform equalizer circuit; correcting for the detected information inter-code interference of an output signal causing lowering of resolution, which occurs when the information is detected, with a waveform equalizer circuit; setting a variable slice level following transient of an output waveform of the waveform equalizer circuit; limiting amplitude of an output waveform form the waveform equalizer circuit with an amplitude limiter circuit using the set variable slice level; eliminating high frequency noise components in an output signal form the amplitude limiter circuit; differentiating the output signal, from which the high frequency noise components are eliminated, to obtain a first order differential signal; differentiating the first order differential signal to obtain a second differential signal; level comparing the first order differential signal to obtain a change direction signal of the differential signal; obtaining an edge information signal from the second order differential signal; and obtaining a read data signal from the change direction signal of the differential signal and the edge information signal.

According to the information recording/reproduction apparatus of the present invention, it is possible to improve the S/N ratio of the apparatus and to eliminate effect of waveform deformation, as well as to extract edge information even if transient is caused by sudden direct current variation by providing a transient correction function immediately before the amplitude limiter circuit or in the amplitude limiter circuit itself.

In addition, it has an advantage that, since the edge information is principally extracted by the second order differential zero-cross detection type reproduction scheme, an edge extraction point is sufficient to exist within amplitude of an amplitude limited signal even if transient cannot be completely cancelled, whereby the transient correction function can be attained with a simple circuit control.

Furthermore, since the advantage of second order differential zero-cross detection type reproduction scheme can be utilized after noise components are reduced in a read signal, the apparatus can be arranged to have higher density and higher speed with a simple circuit configuration, whereby the application of optical disk can be expanded.

Still further, it has been found that the information recording/reproduction apparatus 30 according to the present invention is also effective for the (1, 7) modulation system which is being widely used in the recent years.

Figure 7:
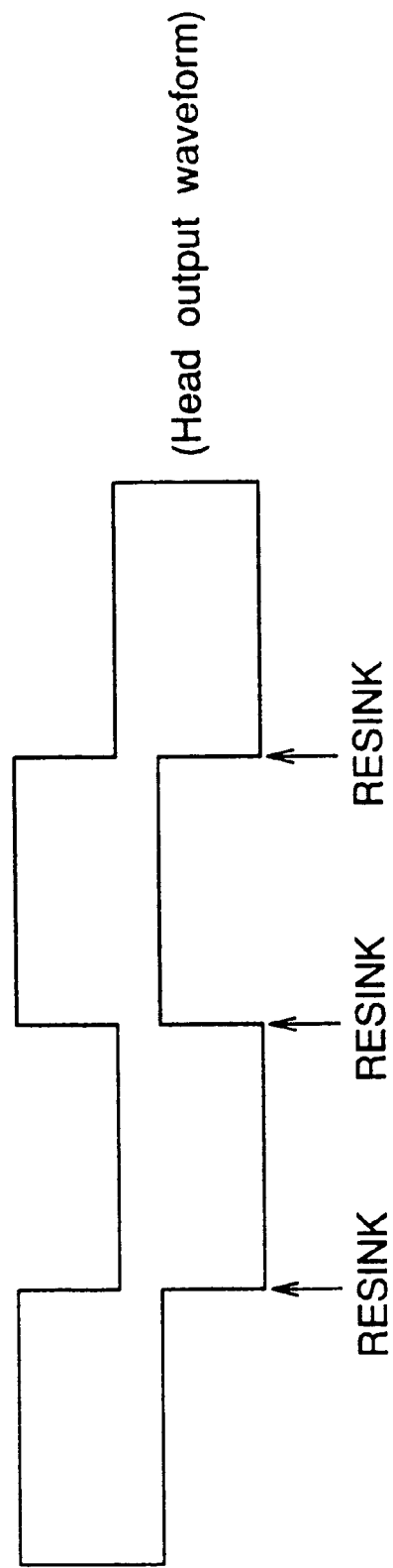
FIG. 7 is an example of head output waveform signal according to a (1, 7) modulation scheme.

That is, in an output waveform signal from a head of the (1, 7) modulation system as shown in FIG. 7, direct current components are sometimes significantly varied around a re-sink area.

For example, assuming that 33 re-sinks exist in one sector (1024 bytes), and transient of several kilohertz occurs due to AC coupling in the circuitry, the prior art may cause read error (error correction of 80 bytes or more) because it eliminates edges, which should be originally extracted, with the amplitude limiter circuit, and, therefore, cannot accommodate the transient only with error correction coding (ECC).

On the other hand, when using the information recording/reproduction apparatus according to the present invention, there arises no read error, so that reading can be performed with little ECC. That is, the present invention can reduce ECC to several bytes or less.

In other words, while the prior art has an error rate of $1\times10^{-3}$ or more in the pattern reading, the present invention has $1\times10^{-5}$ or less.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-227681 (Filed on Aug. 25th, 1997) including specification, claims, drawings and summary are incorporated herein by reference in its entirety.

What is claimed is:

1. An information recording/reproduction apparatus for reproducing information recorded on an information recording medium, said apparatus comprising:

an information detector circuit for extracting said recorded information, a waveform equalizer circuit for correcting lowering of resolution of said information detector circuit, a sag cancellation circuit for correcting an output waveform transient from said waveform equalizer circuit, an amplitude limiter circuit for limiting amplitude of an output signal from said sag cancellation circuit, a filter circuit for eliminating high frequency noise components in an output signal from said amplitude limiter circuit, a first waveform differential circuit for differentiating an output signal from said filter circuit to obtain a first order differential signal, a second waveform differential circuit for differentiating said first order differential signal to obtain a second order differential signal, an enable signal generator circuit for level comparing said first order differential signals to obtain a change direction signal for differential signals, a zero-cross signal generator circuit for obtaining an edge information signal from said second order differential signal, and an edge pulse generator circuit for obtaining a read data signal from said change direction signal and said edge information signal.

2. The apparatus as set forth in claim 1, further comprising a reference slice level circuit for clipping amplitude of an input signal waveform.

3. The apparatus as set forth in claim 1, where in the recording medium is a recording medium selected from a magnetic disk or an optical disk.

4. An information recording/reproduction apparatus for reproducing data recorded on an information recording medium, said apparatus comprising:

information detector means for extracting said recorded information, waveform equalizer means for correcting lowering of resolution of said information detector means, sag cancellation means for correction transient of an output waveform from said waveform equalizer means, amplitude limiter means for limiting amplitude of an output signal from said sag cancellation means, filter means for eliminating high frequency noise components in an output signal from said amplitude limiter means, first waveform differential means for differentiating an output signal from said filter means to obtain a first order differential signal, second waveform differential means for differentiating said first order differential signal to obtain a second order differential signal, enable signal generator means for level comparing said first order differential signals to obtain a change direction signal for differential signals, zero-cross signal generator means for obtaining an edge information signal from said second order differential signal, and edge pulse generator means for obtaining a read data signal from said change direction signal and said edge information signal.

5. An information recording/reproduction apparatus for reproducing data recorded on an information recording medium, said apparatus comprising:

an information detector circuit for extracting the recorded information, a waveform equalizer circuit for correcting lowering of resolution of said information detector circuit, a variable slice level setting circuit for following transient of an output waveform from said waveform equalizer circuit, an amplitude limiter circuit being input with an output of said variable slice level setting circuit and an output of said waveform equalizer circuit, a filter circuit for eliminating high frequency noise components in an output signal from said amplitude limiter circuit, a first waveform differential circuit for differentiating an output signal from said filter circuit to obtain a first order differential signal, second waveform differential means for differentiating said first order differential signal to obtain a second order differential signal, an enable signal generator circuit for level comparing said first order differential signals to obtain a change direction signal for differential signals, a zero-cross signal generator circuit for obtaining an edge information signal from said second order differential signal, and an edge pulse generator circuit for obtaining a read data signal from said change direction signal and said edge information signal.

6. The apparatus as set forth in claim 5, wherein the variable slice level setting circuit comprising:

an amplitude peak/bottom voltage detector circuit for detecting amplitude peak and bottom voltage from the output of the waveform equalizer circuit, and a level adder circuit for determining amount of limit from said voltage.

7. The apparatus as set forth in claim 5, where in the recording medium is a recording medium selected from a magnetic disk or an optical disk.

8. An information recording/reproduction apparatus for reproducing data recorded on an information recording medium, said apparatus comprising:

an information detector means for extracting the recorded information, waveform equalizer means for correcting lowering of resolution of said information detector means, variable slice level setting means for following transient of an output waveform from said waveform equalizer means, amplitude limiter means being input with an output of said variable slice level setting means and an output of said waveform equalizer means, filter means for eliminating high frequency noise components in an output signal from said amplitude limiter means, first waveform differential means for differentiating an output signal from said filter means to obtain a first order differential signal, second waveform differential means for differentiating said first order differential signal to obtain a second order differential signal, enable signal generator means for level comparing said first order differential signals to obtain a change direction signal for differential signals, zero-cross signal generator means for obtaining an edge information signal from said second order differential signal, and edge pulse generator means for obtaining a read data signal from said change direction signal and said edge information signal.

9. An information recording/reproduction method for reproducing data recorded on an information recording medium, said method comprising the steps of:

extracting the recorded information, correcting said extracted information for inter-code interference causing lowering of resolution in an output signal, which occurs when the information is detected, correcting transient in the output signal, limiting amplitude of the output signal corrected for the transient, eliminating high frequency noise components in the output signal limited for amplitude, differentiating said output signal, from which the high frequency noise components are eliminated, to generate a first order differential signal, differentiating said first order differential signal to generate a second order differential signal, level comparing said first order differential signal to obtain a change direction signal for differential signals, generating an edge information signal from said second order differential signal, and generating a read data signal from said change direction signal and said edge information signal.

10. An information recording/reproduction method for reproducing data recorded on an information recording medium, said method comprising the steps of:

performing information detection for extracting said recorded information, performing waveform equalization for correcting for said detected information lowering of resolution due to inter-code interference of an output signal which occurs every time when said information is detected;

setting a variable slice level following transient of the waveform equalized waveform, limiting amplitude of the waveform equalized waveform using said set variable slice level, eliminating high frequency noise components in the output signal limited for amplitude, differentiating said output signal, from which the high frequency noise components are eliminated, to generate a first order differential signal, differentiating said first order differential signal to generate a second order differential signal, level comparing said first order differential signals to obtain a change direction signal for differential signals, generating an edge information signal from said second order differential signal, and generating a read data signal from said change direction signal of the differential signal and said edge information signal.

* * * * *